United States Patent
Jones et al.

(10) Patent No.: US 7,082,250 B2
(45) Date of Patent: Jul. 25, 2006

(54) LASER CLEAVING METHOD AND APPARATUS FOR OPTICAL FIBER CABLES

(75) Inventors: Sean L. Jones, Clarkston, GA (US); Jinkee Kim, Norcross, GA (US); Yu Lu, Norcross, GA (US)

(73) Assignee: Furukawn Electric North America, Inc., Norcross, GA (US)

( * ) Notice: Subject to any disclaimer, the term of this patent is extended or adjusted under 35 U.S.C. 154(b) by 0 days.

(21) Appl. No.: 10/825,341

(22) Filed: Apr. 15, 2004

(65) Prior Publication Data

US 2005/0232564 A1    Oct. 20, 2005

(51) Int. Cl.
  *G02B 6/00*    (2006.01)
(52) U.S. Cl. ............ 385/134; 219/121.61; 219/121.67; 219/121.69
(58) Field of Classification Search ................ 385/134; 219/121.61
  See application file for complete search history.

(56) References Cited

U.S. PATENT DOCUMENTS

| | | | | |
|---|---|---|---|---|
| 4,710,605 | A | * | 12/1987 | Presby ................. 219/121.69 |
| 4,932,989 | A |   | 6/1990  | Presby |
| 5,194,711 | A | * | 3/1993  | Gaukroger ............ 219/121.67 |
| 5,256,851 | A | * | 10/1993 | Presby ................. 219/121.69 |
| 5,421,928 | A |   | 6/1995  | Knecht et al. |
| 6,413,450 | B1|   | 7/2002  | Mays, Jr. |
| 6,552,298 | B1| * | 4/2003  | Wagner ................ 219/121.63 |
| 6,612,754 | B1| * | 9/2003  | Dahmani et al. ............ 385/96 |

* cited by examiner

*Primary Examiner*—Michelle Connelly-Cushwa
*Assistant Examiner*—Rhonda S. Peace

(57) ABSTRACT

A laser cleaving apparatus for use in terminating optical fiber cable ends has a laser beam source, the output of which is directed through a beam distorting member, which produces a beam having a chisel shape with a substantially flat side normal to the axis of a connector fiber containing ferrule and focuses it onto the fiber at a point adjacent the ferrule end face with the flat side also adjacent the end face. A single step polishing stage polishes the cleaved fiber end face to make it flat and flush with the ferrule end face.

6 Claims, 5 Drawing Sheets

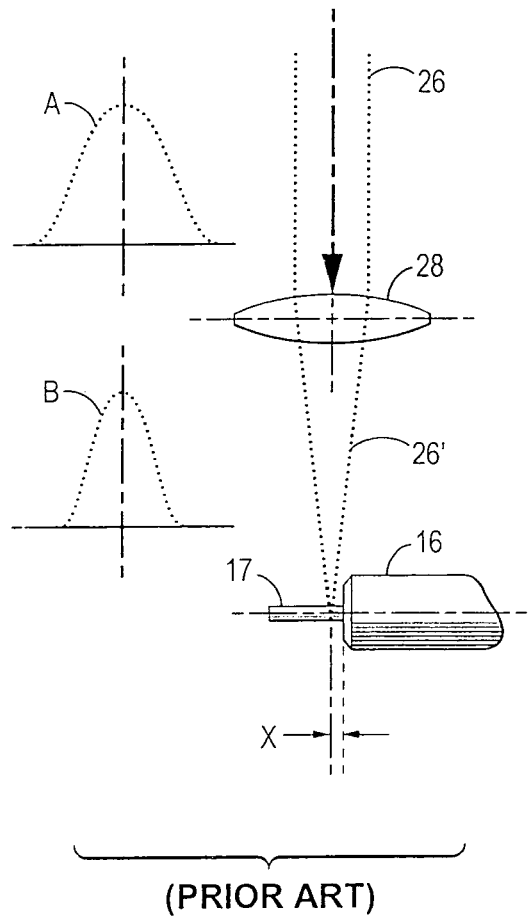
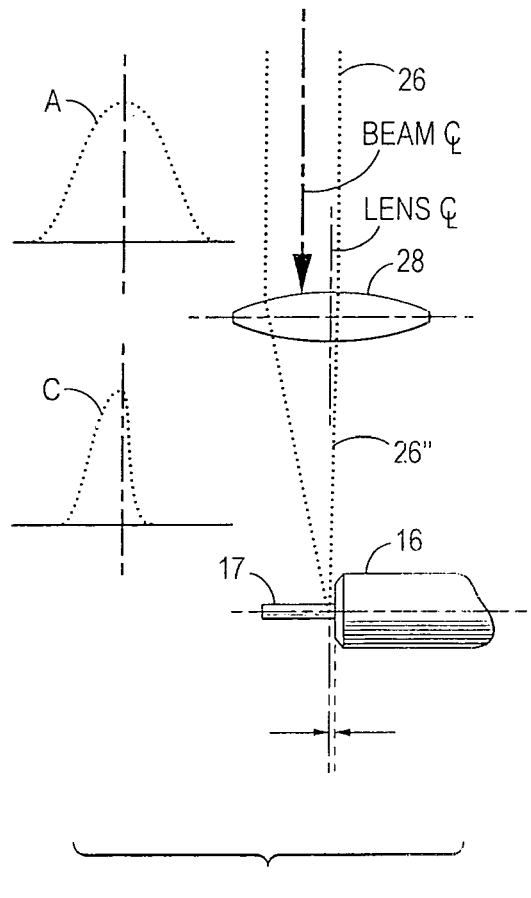
(PRIOR ART)
FIG 5
FIG 6
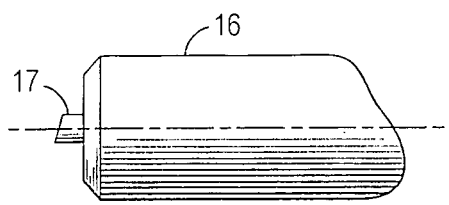
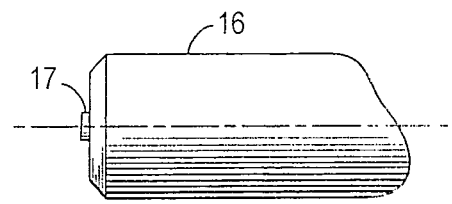
(PRIOR ART)
FIG 5a
FIG 6a

LASER CLEAVING METHOD AND APPARATUS FOR OPTICAL FIBER CABLES

FIELD OF THE INVENTION

This invention relates to automated optical fiber connector assembly and, more particularly, to end face ferrules/fiber preparation by means of laser cleaving.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other. Another goal is to minimize back reflections. Alignment of these small diameter fibers is extremely difficult to achieve, which is understandable when it is recognized that the mode field diameter MFR of, for example, a singlemode fiber is approximately nine (9) microns (0.009 mm). The MFR is slightly larger than the core diameter. Good alignment (low insertion loss) of the fiber ends is a function of the transverse offset, angular alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

In the present day state of the art, there are numerous, different, connector designs in use for achieving low insertion loss and stability. In most of these designs, a pair of ferrules (one in each connector), each containing an optical fiber end are butted together end to end and light travels across the junction.

It can be appreciated that the process of attaching a connector to the end of a fiber, a process that often is performed in the field, requires human intervention, with consequent expenditure of time, and of uncertain accuracy. On the other hand, in the manufacture of jumper cables, i.e., relatively short cable lengths with connectors at each end, for use in making interconnections on a patch panel, for example, the production thereof is substantially completely a manufacturing process, which lends itself to automation, thereby eliminating or reducing human intervention. Virtually the entire process of producing a connectorized end on a jumper cable can be, and, in the present state of the art, is performed by machine or robotic components. However, one phase of the operation has proved difficult to achieve by automation, and that is the cleaving of the fiber contained in the ferrule so as to be flat and flush with the end face of the ferrule. U.S. Pat. No. 4,710,605 of Presby, U.S. Pat. No. 4,932,989 of Presby, U.S. Pat. No. 5,256,851 of Presby, U.S. Pat. No. 5,421,928 of Knecht, and U.S. Pat. No. 6,413,450 of Mays, Jr., each shows an apparatus for cutting or forming fiber ends by means of a focused laser beam. In all such arrangements, the beam is formed to taper to a focal point, thereby producing a Gaussian shape power distribution with its maximum power being along the center of the beam axis, whereas the power gradually decreases away from the center. As a consequence, the cleaved fiber has a slightly angled end face, which is not perfectly flat and flush with the ferrule end face. It then becomes necessary to abrade and polish the fiber end face to make it flat and flush, with a consequent undesirable expenditure of time and possibly stressing of the fiber. Some prior art processes include apparatus for holding the fiber at an angle corresponding to the angle of the beam taper, thereby producing a flat face orthogonal with the fiber (and ferrule) axis. This solution, however, introduces additional apparatus, which is undesirable and requires precise angular orientation of the fiber. Further, in the tilted fiber and ferrule configuration, the laser beam is also focused on the ferrule surface, which may cause a undesirable damage on the ferrule.

In prior art manual and/or automated systems for producing jumper cables, there is a large number of steps involved, from the cutting to length and coiling of the optical fiber cable to the final assembly of the connector. The steps involved, which will be discussed more fully hereinafter, include cutting and removing a portion of the outer jacket and Kevlar strength member (if any), stripping the buffer and coating to bare the fiber, and cleaving the fiber. The fiber is installed and cemented in the ferrule, and the end thereof cleaved to be flat and flush with the ferrule end. Because, as pointed out hereinbefore, the prior art cleaving methods do not produce a desired fiber end, several grinding and polishing steps are necessary, each step having a polishing apparatus and each consuming time and requiring, in total, a considerable amount of polishing consumables, (diamond polishing papers, for example). Each of the numerous polishing steps introduces some variability in the process, hence the large number of steps to achieve the desired flatness and flush end of the cleaved fiber. In the production of connectors, the number of connectors produced per unit of time, dubbed the beat rate, is a function of the number of polishing steps, the greater the number, the greater the beat rate. Thus, the necessity of several polishing stages, each with its consumables. When the number of polishing steps is large, it can be appreciated that the process is lengthened and the number of polishing apparatuses increased. Subsequent to the polishing steps and after testing of the ferrule and fiber end face, the connector is finally assembled on the end of the cable. It can be appreciated that a reduction of the number of process steps in the manufacture of connectorized jumper cables, and other types of connectorized cables to achieve an acceptable beat rate, is highly desirable.

SUMMARY OF THE INVENTION

The present invention is an automated assembly system wherein the number of processing steps, principally the grinding and polishing steps, is greatly reduced by a novel fiber cleaving apparatus that produces in one step, a substantially flat fiber end face. As in prior art cleaving apparatuses, a focused laser beam, which may be produced, for example, by a CW or pulsed $CO_2$ laser and which is employed to cleave the fiber, the beam has a wavelength of, for example, 10.6 microns, and a Gaussian distribution as it emerges from the laser. The apparatus includes a beam distorting member, such as a focusing lens, through which the beam is passed, which, by reason of its position with respect to the beam centerline, distorts the beam so that the Gaussian distribution is modified, and the focused beam has a substantially chisel shape, i.e., one side of the beam is substantially flat and normal to the centerline of the fiber to be cleaved. This chisel shape produces, by means of substantially flat portion of the beam, a substantially flat fiber end face, and also one that is substantially flush with ferrule end face, in one pass of the beam across the fiber. As a consequence, the grinding step and substantially all of the intermediate polishing steps are eliminated, with only a final polishing and cleaning step being necessary for the desired beat rate.

In one embodiment of the cleaving apparatus, the desired distortion of the intensity profile of the beam to other than normal Gaussian is achieved by the centerline of the beam passing through the focusing lens being offset from the centerline of the lens. The beam emerging from the lens has the desired chisel shape, i.e., one substantially straight side and one angled side as a result of a non-symmetrical intensity distribution. The cleaving apparatus includes an arrangement, such as a microscopic camera, CPU, and driven positioning means for monitoring the cleaving process and for positioning the elements involved, i.e., the ferrule end face with the fiber mounted therein and the lens, to achieve optimum results.

In the illustrative embodiment of the invention, the lens and beams have offset centerlines. It is possible to use, instead, an aspheric lens or a filtering apparatus, which, while efficacious, add an additional element of expense to the cleaving apparatus.

These and other principles and features of the present invention will be more readily understood from the following detailed description, read in conjunction with the accompanying drawings.

BRIEF DESCRIPTION OF THE DRAWINGS

FIG. 5 is a diagram of a prior art laser cleaving of a ferrule mounted optical fiber;

FIG. 5a is an enlarged view of the end of the cleaved fiber;

FIG. 6 is a diagram of the fiber cleaving arrangement of the present invention;

FIG. 6a is an enlarged view of the end of the cleaved fiber; and

DETAILED DESCRIPTION

Figure 1:
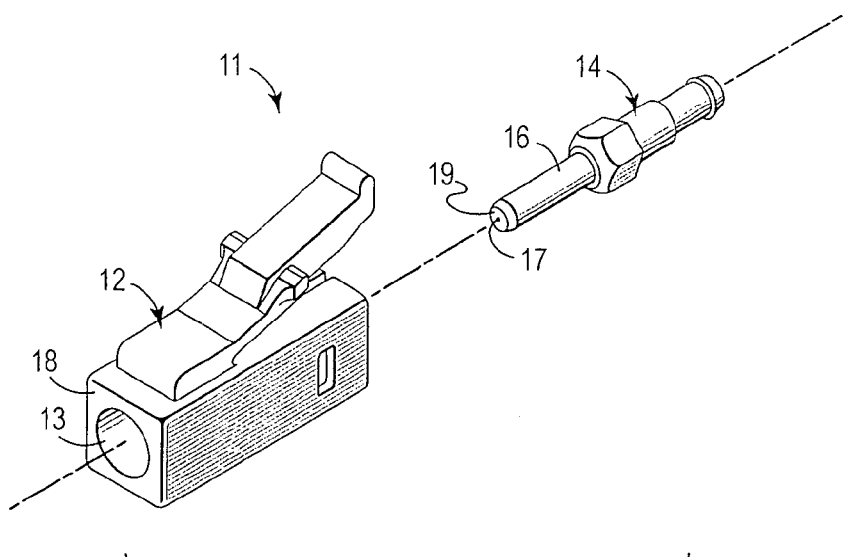
FIG. 1 is an exploded perspective view of an optical connector.

FIG. 1 is an exploded perspective view of a portion of a connector 11 which comprises a front housing 12 having a bore 13 extending therethrough into which a barrel member 14 is inserted. Member 14 has a ferrule 16 affixed thereto which contains the optical fiber 17, which is generally cemented within the ferrule. When assembled, the ferrule 16 projects out of the front portion 18 of the housing with its front face so positioned to butt against a connecting ferrule. The connector 11 is shown by way of example and is not intended to be representative of any particular connector type being intended, instead to represent any connector having a ferrule within.

As discussed hereinbefore, it is desirable that the front end of fiber 17 is flush with the front face 19 of the ferrule, and that it be flat, in a plane orthogonal to the connector centerline. The front face 19 of ferrule 16 is shown in FIG. 1 as being curved, which is common practice in the prior art, but it is necessary that the end of fiber 17 be flush therewith at the centerline. It is standard practice in the art to cleave the fiber 17 as close to the ferrule face 19 as can be achieved, and then to grind and polish the fiber end until the desired geometry of the ferrule end 19 is realized.

Figure 2:
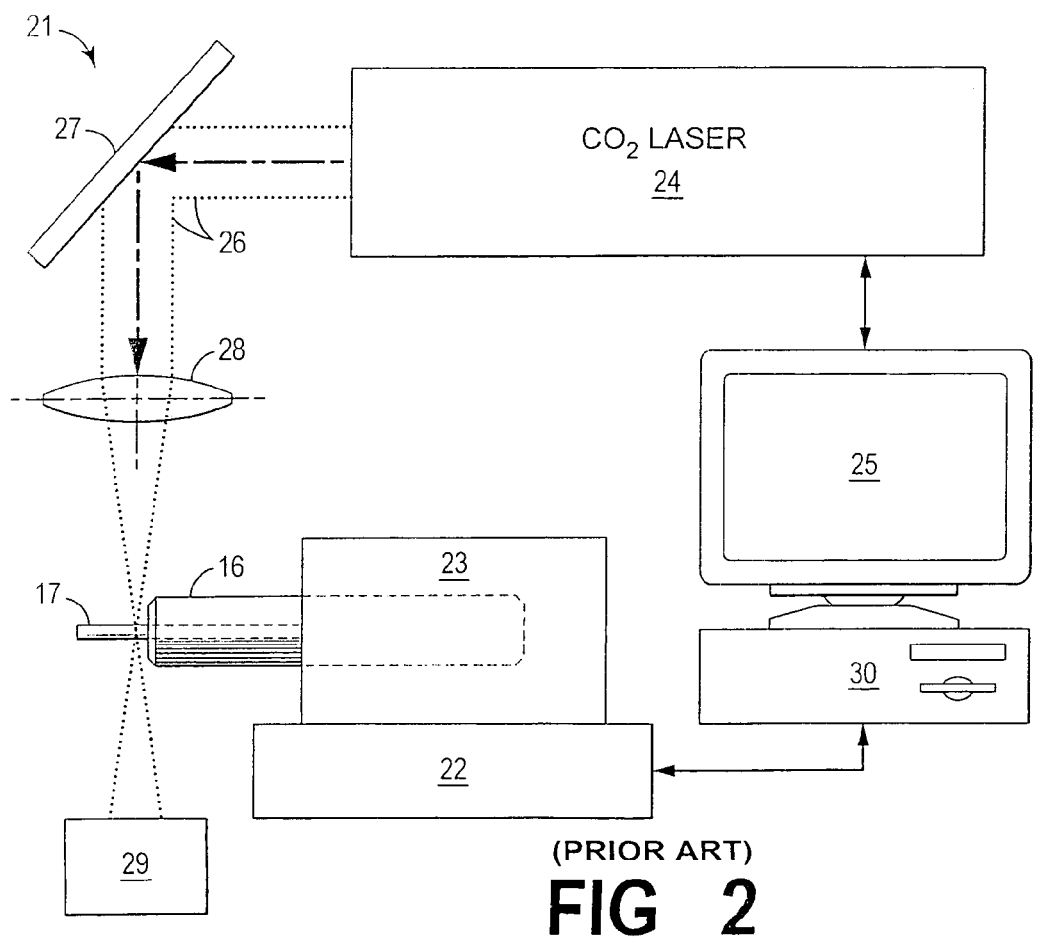
FIG. 2 is a fiber cleaving system as used in the prior art.

In FIG. 2 there is shown diagrammatically a typical prior art arrangement 21 for laser cleaving the fiber 17 prior to grinding and polishing. The apparatus 21 comprises a support member 22, movable in translation, which supports a holder 23 which holds the optical connector (not shown) and the ferrule 16 projecting therefrom. A $CO_2$ laser 24, for example, emits a light beam 26 usually at a wavelength of 10.6 microns. The beam 26 is redirected as shown by a mirror 27 or other type of reflecting member towards a focusing lens 28 which focuses the beam to a point at the location where it impinges on the fiber 17. The beam 26 passes through the fiber 17 and is collected by an absorption device 29. In some applications, instead of absorption device 29, a concave mirror, not shown, may be used to reflect and refocus the beam back to fiber 17. The cleaving operation may be monitored by appropriate apparatus, shown as a display device and CPU 31 and 32 respectively, which may, for example, control the positioning of member 22 and hence ferrule 16 and fiber 17.

Figure 3:
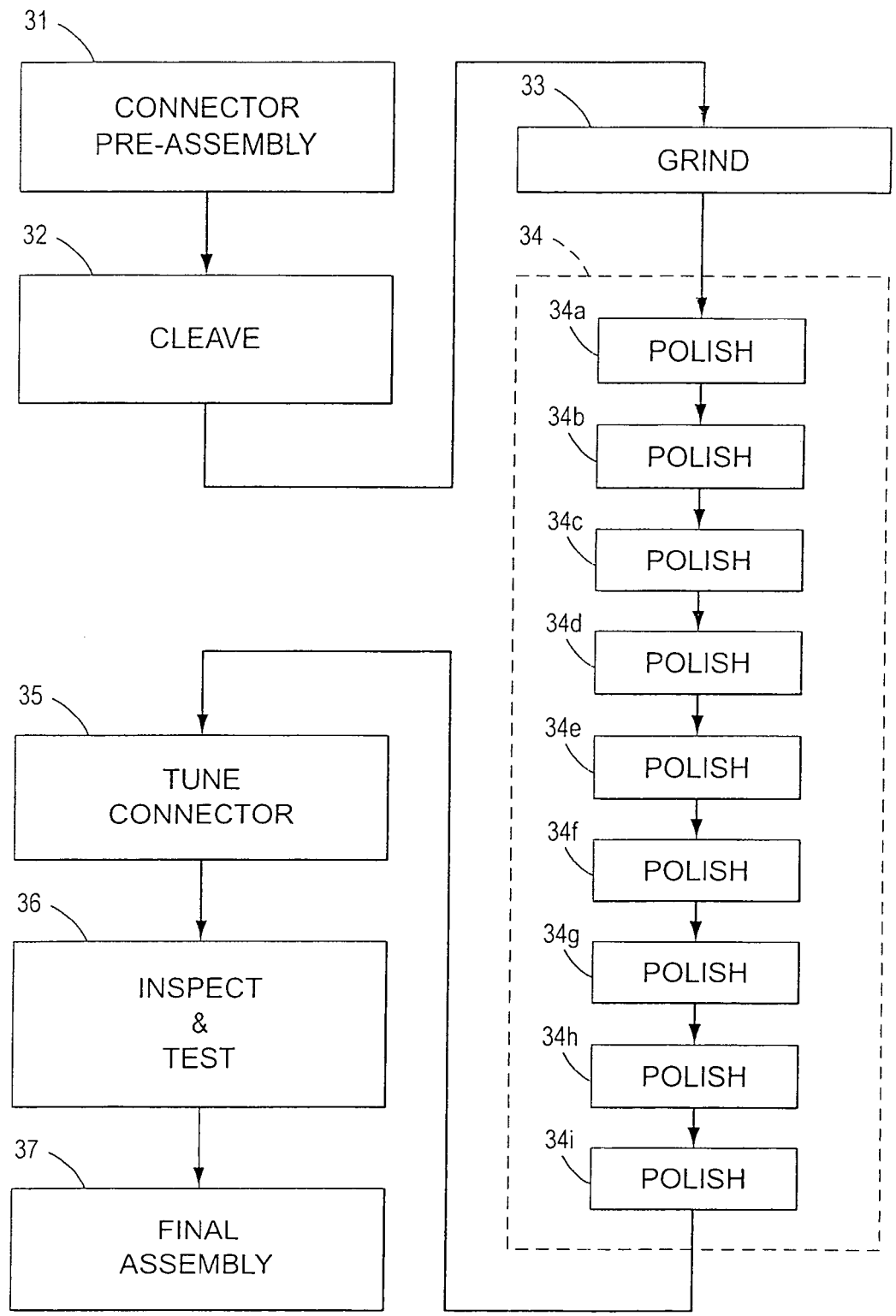
FIG. 3 is a block diagram flow chart for manual or automated production of terminated fiber cables.

FIG. 3 is a block diagram flow chart for a prior art manual or automated jumper cable production process. To facilitate the understanding of the process, it has been divided into a plurality of stages 31–37 representing automatic operations, although there may be some manual steps involved. While FIG. 3 represents an automated system, all of the steps performed may be, and have been, in the past, manual. Stage 31 includes the automated step of cutting the cable to the desired length, loading the connector parts thereon, which is usually done manually, removing the outer jacket and strength member, usually Kevlar®, stripping the buffer layer, cleaning the fiber and cementing it within the ferrule. The fiber projecting from the end or face of the ferrule is then cleaved in stage 32. The cleaving operation can use the conventional score-and-break technique or the laser cleave depicted in FIG. 2. Both methods leave the cleaved fiber projecting from the face of the ferrule, and the fiber end face is thus neither flat nor flush with the ferrule end face. It is necessary, therefore, in stage 33 to grind the fiber end by suitable grinding apparatus, and then polish it in a plurality of polishing stages 34a through 34i until the desired flatness and flush condition are achieved. Each polishing apparatus 34a–34i polishes for approximately thirty seconds, and, as shown in FIG. 3, there are nine such apparatuses. Thus a single work piece passing through the stage 34 polishing does so in approximately four and one-half minutes. However, in a production line milieu, each polishing apparatus 34a–34i will be operating on a separate work piece at the same time and, therefore, the second work piece exits stage 34 only thirty seconds behind the first work piece. Thus, the beat rate for the stage 34 and, in actuality, for the entire apparatus of FIG. 3, is approximately two connectors per minute. This rate can be increased by increasing the number of polishing apparatuses, thereby decreasing the amount of time spent per polishing apparatus, such as, for example, twenty seconds. After the cable passes through stage 34, it is subjected to an optical tuning in stage 35, a final inspection and test in stage 36 and a final assembly in stage 37.

It can be appreciated from the foregoing that the cleaving of the fiber end necessitates thereafter a large number of polishing apparatuses constituting multiple polishing stations and relatively large amounts of polishing materials, thereby adding greatly to the cost of both apparatus and production.

Figure 4:
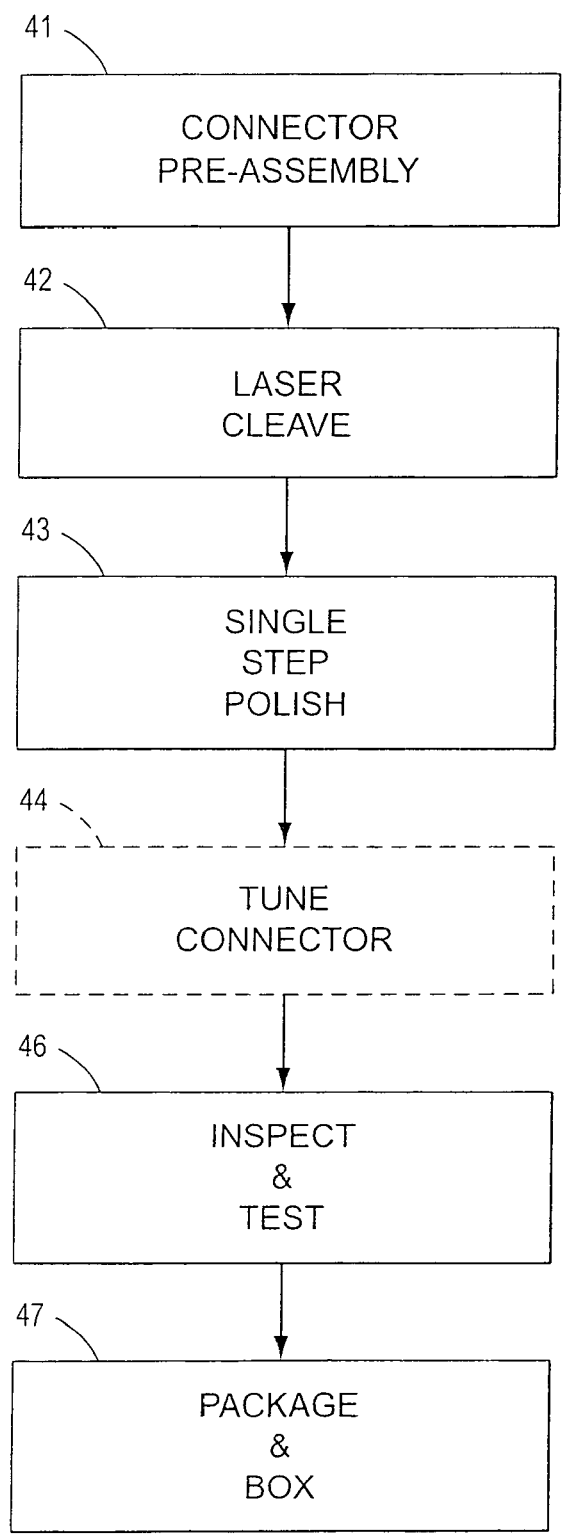
FIG. 4 is a block diagram flow chart including the cleaving apparatus of the present invention.

In FIG. 4 there is shown, in accordance with the present invention, an improved process from the laser cleave to and including final packaging. In FIG. 4, stage 41 includes connector pre-assembly, the connector pre-assembly, the output of which is directed to the laser cleaving apparatus 42 of the present invention, as will be discussed more fully hereinafter. The output of the cleaving apparatus is directed to a single step polishing stage 43, which roughly corresponds to module 34 of FIG. 3, and which requires less than thirty seconds to produce a clean, flat fiber end that is flush with the ferrule end face.

After the polishing stage 43 and before the inspection and testing stage 46, a tuning stage 44, shown in dashed lines, may be, if desired, inserted. Stages 46 and 47 substantially correspond to stages 36 and 37 of FIG. 3.

As will be seen and understood more fully hereinafter, the cleaving stage 42, embodying the cleaving apparatus of the present invention, makes possible the elimination of a large number of polishing steps and associated apparatus and consumable materials, thereby not only reducing materially the cost of the production apparatus and associated materials, but, also, by greatly simplifying the apparatus, reducing the maintenance costs of the production line.

The production line is shown for preparation and inventing one connector to a cable end. For jumper cables and the like, the same process is duplicated for the other end.

FIG. 5 depicts the focusing of the laser beam 26 in the prior art apparatus depicted in FIG. 2 by means of lens 28. To achieve focusing at a point, the centerlines of the beam 26 and of the lens 28 are coincident. The beam 26, prior to passing through lens 28 has a Gaussian intensity distribution as shown in curve A, and after passing through lens 28, becomes focused but still has the Gaussian shape distribution as shown in curve B. The focused beam 26' converges to a point on fiber 17, thereby cleaving it. Because of the Gaussian distribution as shown in curve B, the laser power has the maximal power in the center and gradually reduce the power to the edge. It causes the beam center temperature to be higher than the edge, thus cutting deeper. This effect plus the wedge shape of focused beam 26' result in an angular end face of fiber 17, as discussed hereinbefore and as shown in FIG. 5a. It can further be seen that the tapered beam 26' will be partially interfered with by the end of ferrule 16 if the cleaving point is too near the ferrule end face. This necessitates having the cleaving point at a distance X from the ferrule end face to prevent such interference. It is common practice to have a curved ferrule end face, not shown, in which the distance X can be reduced to some extent. There remains, however, an undesirable length of projection of the fiber 17 from the ferrule end face after cleaving. It is the projection, and the angular end face of the fiber, that must be eliminated by the numerous grinding and polishing steps shown in FIG. 3.

The basic principle of the cleaving operation of the present invention is illustrated in FIG. 6. For better understanding, those elements in FIG. 6 that are the same or are similar to elements in FIG. 5 are given the same reference numerals. Thus laser beam 26 passes through lens 28, which focuses it upon fiber 17 in ferrule 16. Beam 26 has a Guassian distribution A as it emerges from the laser. In accordance with the invention, the centerline of the beam is offset from the centerline of the lens and, as a consequence, the intensity distribution (and shape) of the beam is distorted by the lens 28, the beam 26" emerging therefrom having a chisel shape, as shown, and an intensity distribution C in which one side is substantially flat. As a consequence, the flat side of the beam 26" has substantially rapid power decrease and only has high power concentrated in the center. In addition, the flat side is more parallel to the ferrule 16 end face, or put another way, is normal to the ferrule axis, and cleaves the fiber 17 virtually flush with the ferrule end face and virtually flat as depicted in FIG. 6a. As a consequence, polishing of the fiber 17 end face, after cleaving, only requires a single step. As was pointed out in the foregoing, an aspheric lens, or other means of beam distortion may be used to crate a beam with the desired chisel shape and sufficient energy intensity to cleave the fiber 17 to produce the desired result.

Figure 7:
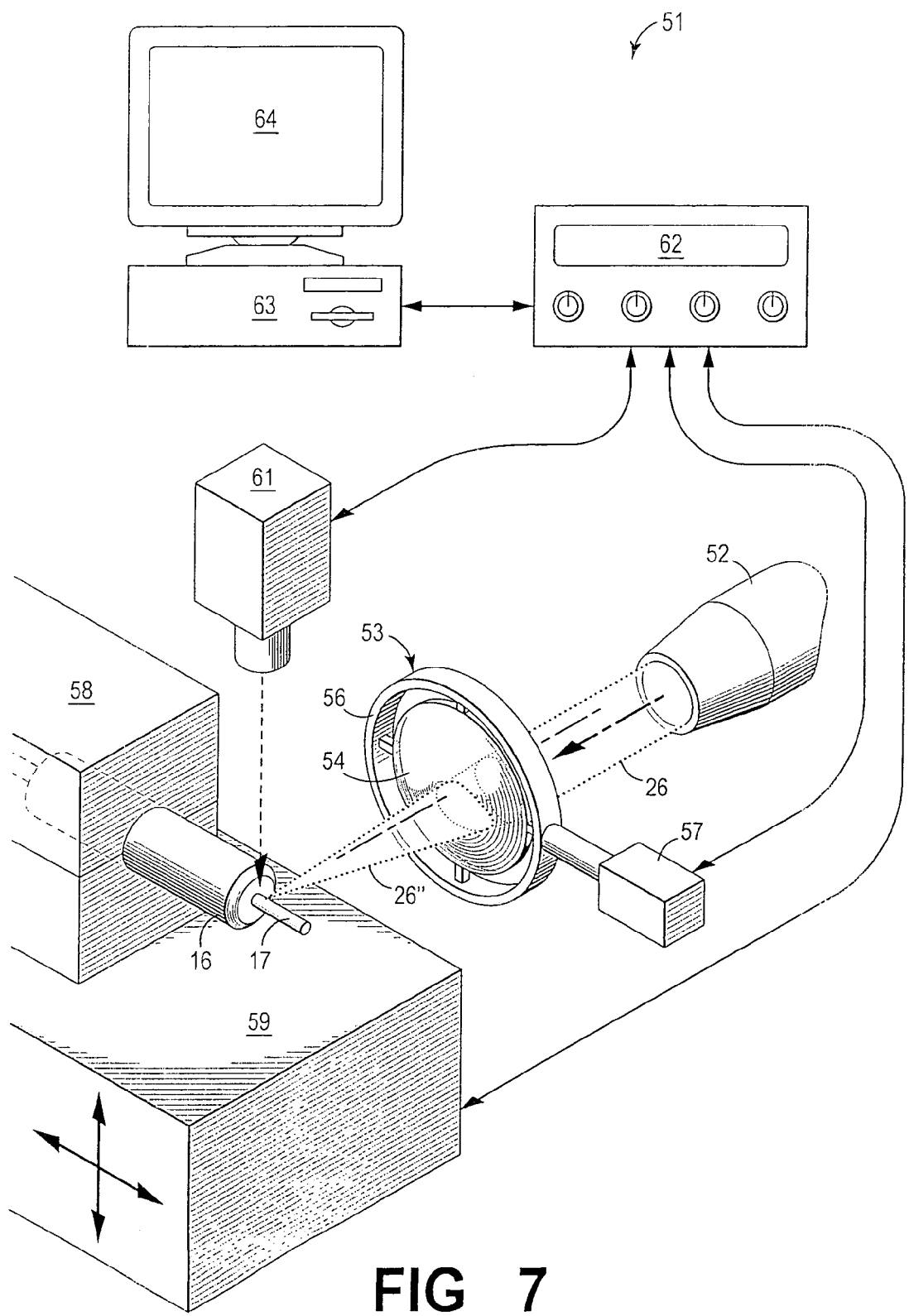
FIG. 7 is a diagram of the cleaving apparatus and connections of the present invention.

FIG. 7 depicts an apparatus 51 for performing the cleaving operation of stage 42 of FIG. 4 Apparatus 51 comprises, preferably, a $CO_2$ laser 52, which emits a beam 26 having a wavelength of preferably 9.3 microns. It is to be understood that other laser types and other wavelengths may be used, however, the $CO_2$ laser of 9.3 microns wavelength has been found to work extremely well in cleaving the fiber 17. The beam passes through the distorting member 53, shown in FIG. 7 as a lens 54 mounted in a suitable holder 56. A positioning member 57 is adapted to move the member 53 into the proper position, as described in connection with FIG. 6. The distorted beam 26" is focused on the fiber 17 mounted in ferrule 16 as described in connection with FIG. 6. Ferrule 16, and other parts of the connector, not shown is mounted on a holder 58 which is, in turn, mounted on a movable support member 59 which is movable both vertically and horizontally, as shown by the arrow, to position the fiber to be cleaved at the focal point of beam 26". A microscopic camera 61 is focused on the ferrule end face, fiber, and beam focal point and is adapted to send signals indicative of the positions thereof to a control panel 62, which in turn is connected to a CPU 63 and display 64. The CPU 63 and control pane 62 on the basis of the signals received from the camera 61 send signals to member 57 and 59 to position the ferrule and fiber relative to distorted beam 26" as shown in FIG. 6, and display device 64 given visual monitoring of the positioning operation. Cleaving then takes place, after which the signal stage 43 polishing takes place.

From the foregoing, it is readily apparent that cleaving operation of the invention materially reduces the polishing stage for a cleaved fiber as a result of the manner in which the fiber is cleaved and the apparatus for accomplishing such cleaving. While the apparatus and process has been shown as used for terminating jumper cables, it is readily usable for termination of other types of fiber cables, as well as other work pieces wherein ferrule mounted fiber are used.

It is to be understood that the various features of the present invention might be incorporated into other types of cleaving mechanisms, and that other modifications or adaptations might occur to workers in the art. All such variations and/or modifications are intended to be included herein as being within the scope of the present invention as set forth. Further, in the claims hereafter, the corresponding structures, materials, acts and equivalents of all means or step-plus-function elements are intended to include any structure, material or acts for performing the functions in combination with other elements as specifically claimed.

Therefore, having thus described the invention, at least the following is claimed:

1. A method of cleaving an optical fiber mounted in a ferrule having an end face from which the fiber projects comprising the steps of:
   creating a laser beam having a Gaussian curve intensity distribution;
   directing said beam through a beam distorting member to alter the intensity distribution thereof to crate a chisel shaped beam having a flat portion and an angled portion;

directing the beam to impinge on the optical fiber with the flat portion of the beam being closely adjacent the end face of the ferrule and normal of the axis thereof; and polishing the end face of the cleared fiber to be flat and flush with the end face of the ferrule in a single polishing step.

2. The method as claimed in claim 1 and further including the step of visually monitoring the location of the distorted beam relative to the end face of the ferrule.

3. The method as claimed in claim 2 and further including the step of moving the beam distorting member into a position to achieve the desired beam configuration for cleaving the fiber.

4. The method as claimed in claim 3 wherein the beam distorting member has a central axis and it is moved to a position where the axis of the beam distorting member is offset from the axis of the beam incident thereon.

5. The method as claimed in claim 2 and further including the step of moving the ferrule end face into a position where the flat portion of the beam is immediately adjacent the ferrule end face.

6. A system for producing optical fiber jumper cables having connectors at the ends thereof said connectors having ferrules holding fibers, said system comprising:

a first series of stages for cutting the cable to length, stripping the ends thereof, and inserting and affixing the fiber into the connector ferrule;

a laser cleaving stage for receiving the output of said first series of stages, said laser cleaving stage comprising:

a laser for generating a laser beam having a Gaussian energy distribution; and a beam distorting member for producing a beam having a flat side substantially normal to the axis of the ferrule and focusing it to a point on the fiber adjacent to the end face of the ferrule;

a single step polishing stage for receiving the output of said cleaving stage and polishing the end of the fiber to be flat and flush with the ferrule end face, and an inspection and testing stage for receiving the output of said single step polishing stage.

* * * * *